United States Patent
Nam et al.

(10) Patent No.: US 10,862,606 B2
(45) Date of Patent: Dec. 8, 2020

(54) SIGNALING AND USING VIRTUAL CELL IDENTIFICATION FOR SFN-TYPE TRANSMISSIONS

(71) Applicant: QUALCOMM Incorporated, San Diego, CA (US)

(72) Inventors: Wooseok Nam, San Diego, CA (US); Tao Luo, San Diego, CA (US); Makesh Pravin John Wilson, San Diego, CA (US); Sony Akkarakaran, Poway, CA (US); Kaushik Chakraborty, San Diego, CA (US); Shengbo Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 159 days.

(21) Appl. No.: 16/005,181

(22) Filed: Jun. 11, 2018

(65) Prior Publication Data

US 2018/0367233 A1 Dec. 20, 2018

Related U.S. Application Data

(60) Provisional application No. 62/520,766, filed on Jun. 16, 2017.

(51) Int. Cl.
*H04J 11/00* (2006.01)
*H04W 48/16* (2009.01)

(52) U.S. Cl.
CPC ......... *H04J 11/0079* (2013.01); *H04W 48/16* (2013.01)

(58) Field of Classification Search
CPC .. H04J 11/0076; H04J 11/0079; H04H 20/67; H04W 48/12; H04W 48/16
See application file for complete search history.

(56) References Cited

U.S. PATENT DOCUMENTS

| 6,081,723 A * | 6/2000 | Mademann | H04W 60/00 370/338 |
| 2013/0111044 A1* | 5/2013 | Cherian | H04W 76/10 709/228 |

(Continued)

FOREIGN PATENT DOCUMENTS

WO WO-2017034506 A1 3/2017

OTHER PUBLICATIONS

International Search Report and Written Opinion—PCT/US2018/037172—ISA/EPO—dated Aug. 23, 2018.

(Continued)

*Primary Examiner* — Kevin C. Harper
(74) *Attorney, Agent, or Firm* — Arent Fox, LLP

(57) ABSTRACT

Various aspects described herein relate to techniques for signaling and using one or more virtual cell identifications (V-cell IDs) for single frequency network (SFN)-type of transmissions in wireless communications systems. A method, a computer-readable medium, and an apparatus are provided. In an aspect, the method may include performing, by a user equipment (UE), a cell search to obtain a cell ID, and decoding, by the UE, a message based on the cell ID, wherein the message includes a master information block (MIB). The method may further include identifying, by the UE, a virtual cell ID used for SFN-type transmissions based on information decoded from the message. The techniques described herein may apply to different communications technologies, including 5th Generation (5G) New Radio (NR) communications technology.

38 Claims, 8 Drawing Sheets

(56) References Cited

U.S. PATENT DOCUMENTS

| | | |
|---|---|---|
| 2014/0071957 A1* | 3/2014 | Xu .................. H04W 4/70 |
| | | 370/336 |
| 2014/0226638 A1 | 8/2014 | Xu et al. |
| 2014/0233525 A1* | 8/2014 | Kim .................. H04L 5/0051 |
| | | 370/329 |
| 2014/0348063 A1 | 11/2014 | Kang et al. |
| 2014/0376486 A1* | 12/2014 | Lee .................. H04W 72/1278 |
| | | 370/329 |
| 2015/0163687 A1* | 6/2015 | Lee .................. H04W 24/10 |
| | | 370/252 |
| 2015/0373626 A1 | 12/2015 | Yi et al. |
| 2016/0105862 A1* | 4/2016 | Charbit .................. H04W 4/70 |
| | | 370/336 |
| 2016/0278032 A1 | 9/2016 | Yi et al. |
| 2018/0048413 A1 | 2/2018 | Liu et al. |

OTHER PUBLICATIONS

QUALCOMM Incorporated: "Remaining System Information Delivery Consideration," 3GPP Draft; R1-1705569, Remaining System Information Delivery Consideration, 3rd Generation Partnership Project (3GPP), Mobile Competence Centre; 650, Route Des Lucioles; F-06921 Sophia-Antipolis CED, vol. RAN WG1, No. Spokane, USA; Apr. 3, 2017-Apr. 7, 2017, Apr. 2, 2017, XP051243697, 2 pages, Retrieved from the Internet: URL: http://www.3gpp.org/ftp/Meetings_3GPP_SYNC/RAN1/Docs/ [retrieved on Apr. 2, 2017].

* cited by examiner

SIGNALING AND USING VIRTUAL CELL IDENTIFICATION FOR SFN-TYPE TRANSMISSIONS

CROSS-REFERENCE TO RELATED APPLICATIONS

This application claims the benefit of U.S. Provisional Application Ser. No. 62/520,766, entitled "Signaling and Using Virtual Cell Identification for SFN-Type Transmissions" and filed on Jun. 16, 2017, the content of which is expressly incorporated in its entirety.

BACKGROUND

Aspects of the present disclosure relate generally to wireless communications systems, and more particularly, to techniques for signaling and using virtual cell identification (V-cell ID) for single frequency network (SFN)-type transmissions in wireless communications systems (e.g., a 5G New Radio system).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communications systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and higher system reliability, new approaches may be desirable to improve resource utilization and energy efficiency by using SFN-type of transmissions, combination of SFN and beam sweeping, and/or enhanced signaling and usage of V-cell ID for SFN-type of transmissions, in order to enhance services, waveform and air-interface design, to satisfy consumer demand, and to improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

According to an example, a method related to signaling and use of virtual cell identification (V-cell ID) for single frequency network (SFN)-type of transmissions in wireless communications systems is provided. The method may include performing, by a user equipment (UE), a cell search to obtain a cell ID, and decoding, by the UE, a message based on the cell ID, wherein the message includes a master information block (MIB). The method may further include identifying, by the UE, a virtual cell ID used for SFN-type transmissions based on information decoded from the message.

Aspects of the present disclosure include an apparatus for wireless communications having a memory configured to store instructions, a transceiver, and at least one processor communicatively coupled with the memory and the transceiver, wherein the at least one processor is configured to execute the instructions to perform a cell search to obtain a cell identification (ID), decode a message based on the cell ID, wherein the message includes a master information block (MIB), and identify a virtual cell ID used for single frequency network (SFN)-type transmissions based on information decoded from the message.

In an aspect, the present disclosure includes a computer-readable medium having instructions stored therein that, when executed by at least one processor, cause the at least one processor to: perform a cell search to obtain a cell identification (ID), decode a message based on the cell ID, wherein the message includes a master information block (MIB), and identify a virtual cell ID used for single frequency network (SFN)-type transmissions based on information decoded from the message.

Aspects of the present disclosure include an apparatus for wireless communications including means for performing a cell search to obtain a cell identification (ID), means for decoding a message based on the cell ID, wherein the message includes a master information block (MIB), and means for identifying a virtual cell ID used for single frequency network (SFN)-type transmissions based on information decoded from the message.

In an aspect, another method related to signaling and use of V-cell ID for SFN-type of transmissions in wireless communications systems is provided. The method includes determining, by a base station, one or more SFN-type transmissions, broadcasting a message based on a cell ID, wherein the message includes a master information block, and sending, by the base station, a V-cell ID used for the determined one or more SFN-type transmissions.

In some aspects, the present disclosure includes an apparatus for wireless communications including a memory configured to store instructions, a transceiver, and at least one processor communicatively coupled with the memory and the transceiver, wherein the at least one processor is configured to execute the instructions to: determine one or more single frequency network (SFN)-type transmissions, broadcast, via the transceiver, a message based on a cell ID, wherein the message includes a master information block (MIB), and send, via the transceiver, a virtual cell identification (ID) used for the determined one or more SFN-type transmissions.

Some aspects of the present disclosure include a computer-readable medium having instructions stored therein that, when executed by at least one processor, cause the at least one processor to determine one or more single frequency network (SFN)-type transmissions, broadcast, via the transceiver, a message based on a cell ID, wherein the message includes a master information block (MIB), and send, via the transceiver, a virtual cell identification (ID) used for the determined one or more SFN-type transmissions.

In an aspect, the present disclosure includes an apparatus for wireless communications including means for determining one or more single frequency network (SFN)-type transmissions, means for broadcasting a message based on a cell ID, wherein the message includes a master information block (MIB), and means for sending a virtual cell identification (ID) used for the determined one or more SFN-type transmissions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1A:
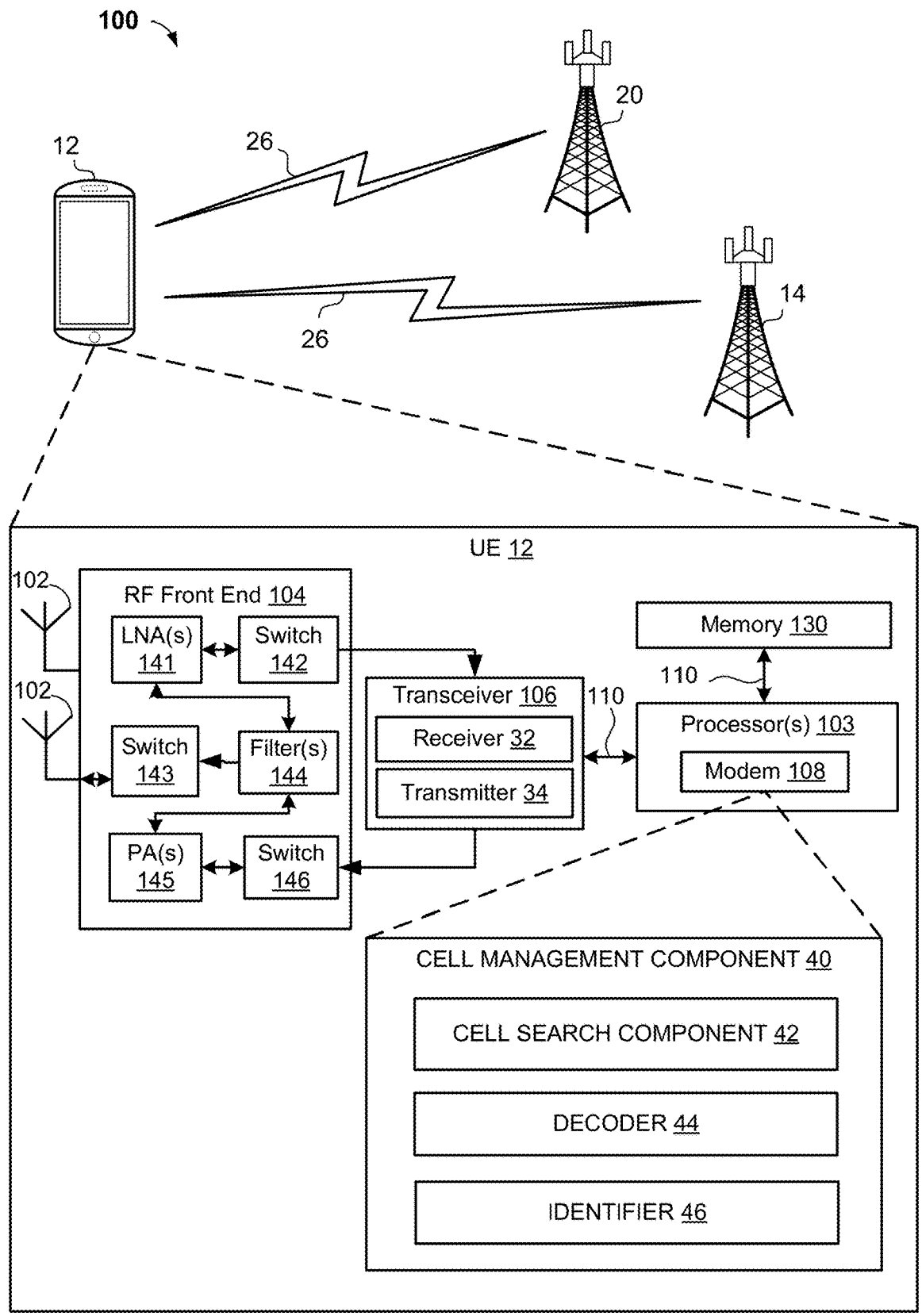
FIG. 1A is a block diagram illustrating a first example of a wireless communications system (e.g., a 5G NR system) including a user equipment (UE) and one or more base stations for signaling and use of virtual cell identification (V-cell ID) for single frequency network (SFN)-type transmissions, according to one or more of the presently described aspects.

In a wireless communications system (e.g., a cellular system, or a 5G NR system), some information may be signaled or delivered (or target to be delivered) from a network (e.g., a base station, or a gNB) to multiple (e.g., a large set of) receivers (e.g., user equipments (UEs)). In some examples, the information may be system information, common control signal(s), paging message(s) and/or public warning(s). In an aspect, broadcast messages usually have high reliability requirements, because different receivers or UEs may need to decode the information in different channel conditions or environments. In some cases, low-order modulation (or modulation format) and/or low code rates may be used. In some examples of beamformed communications (e.g. millimeter Wave (mmW), or in one or more other bands), beam sweeping may be used. In an aspect, a beam, typically narrow in width (e.g., beam width), may be used for a target UE, and for broadcasting or paging one or more messages to multiple UEs, beam sweeping may be performed.

However, in some aspects, broadcast messages (or paging messages) are often resource intensive due to the high reliability requirements and/or beam sweeping. In some cases, broadcast or paging messages may cover multiple cell areas. In some examples, for synchronous deployment, by allowing single frequency network (SFN)-type of transmission of broadcast messages, or combination of SFN and beam sweeping, the overall resource consumption may be reduced, and the system reliability may be improved.

In some aspects, for SFN-type transmission, multiple cells, transmit points (TXPs), and/or base stations (e.g., gNBs) may use or share a same V-cell ID, which may be signaled and/or configured in advance (e.g., before the SFN-type transmission). For example, the UE may be aware of or indicated the V-cell ID in advance (e.g., before SFN-type communications). In an example, some broadcast messages are for UEs in RRC_IDLE state or mode, therefore the V-cell ID may need to be delivered before the connection setup is completed.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. In some aspects, the computer-readable media may be non-transitory or include a non-transitory computer-readable storage medium.

Described herein are various aspects related to a wireless communications system (e.g., 5G NR system), in particular, techniques for signaling and using V-cell ID for SFN-type of transmission(s). In some aspects, each cell has a cell ID, which may be reused from a large set of cell IDs and may be acquired by a cell search procedure. In some examples, a cell ID may determine one or more cell-specific reference signal (RS) patterns and/or scrambling codes. For example, the one or more cell-specific RS patterns and/or scrambling codes may be used for one or more target UEs (e.g., a set of UEs). In a conventional communications system (e.g., an LTE system), a V-cell ID may be provided by dedicated signaling from the network to one or more UEs in RRC_CONNECTED state or mode. In some examples, a V-cell ID may be used for configuration of multiple cells to use the same RS patterns and/or scrambling codes for coordinated or SFN-type transmission(s).

In some aspects of 5G NR, a V-cell ID may be provided or delivered to one or more UEs in idle mode and/or connected mode. In some cases, for RRC_CONNECTED UEs, a V-cell ID may be provided via dedicated signaling, or any appropriate signaling discussed herein (e.g., via master information block (MIB), or minimum system information block (MSIB)).

Each of the aspects described above are performed or implemented in connection with FIGS. 1-6, which are described in more detail below.

Referring to FIG. 1A, in an aspect, a wireless communication system 100 includes at least one UE 12 in communication coverage of at least one network entity 14 or network entity 20 (e.g., base station or gNB, or a cell thereof, in a 5G NR network). UE 12 may communicate with a network via the network entity 14 or network entity 20. In some aspects, multiple UEs including UE 12 may be in communication coverage with one or more network entities, including network entity 14 and network entity 20. In an aspect, the network entity 14 or network entity 20 may be a base station such a gNB in a 5G NR network. Although various aspects are described in relation to a UMTS, LTE, or 5G NR networks, similar principles may be applied in other wireless wide area networks (WWAN). The wireless network may employ a scheme where multiple base stations may transmit on a channel. In an example, UE 12 may transmit and/or receive wireless communications (e.g., beamforming or beams) to and/or from network entity 14 and/or network entity 20. For example, the UE 12 may be actively communicating with network entity 14 and/or network entity 20.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, network entity 14 or network entity 20 may be a macrocell, picocell, femtocell, relay, Node B, mobile Node B, smallcell box, UE (e.g., communicating in peer-to-peer or ad-hoc mode with UE 12), or substantially any type of component that can communicate with UE 12 to provide wireless network access at the UE 12.

According to the present aspects, the UE 12 may include one or more processors 103 and a memory 130 that may operate in combination with a cell management component 40, a cell search component 42, a decoder 44, and/or an identifier 46. In some examples, the cell management component 40 may be configured to receive and use a V-cell ID for SFN-type communications. In an aspect, the cell search component 42 may be configured to perform a cell search to obtain one or more cell IDs. In an aspect, the decoder 44 may be configured to decode MIB and/or MSIB (e.g., received from the network entity 14 or 20) to obtain system information, V-cell ID, resources, and/or paging information. In another aspect, the identifier 46 may be configured to perform identifying the V-cell ID used for SFN-type transmissions, and/or related operations as described herein.

In an aspect, the term "component" as used herein may be one of the parts that make up a system, may be hardware, firmware, and/or software, and may be divided into other components. The cell management component 40 may be communicatively coupled to a transceiver 106, which may include a receiver 32 for receiving and processing RF signals and a transmitter 34 for processing and transmitting RF signals. The cell management component 40 may include the cell search component 42 and/or the decoder 44 for performing ciphering/deciphering management and operations. The processor 103 may be coupled to the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by UE 12 or network entity 14/20. The receiver 32 may obtain measurements of the signals. For example, the receiver 32 may determine Ec/Io, SNR, etc.

The transmitter 34 may include hardware, firmware, and/ or software code executable by a processor for transmitting data, the code comprising instructions and being stored in a memory (e.g., computer-readable medium). The transmitter 34 may be, for example, a RF transmitter.

In an aspect, the one or more processors 103 may include a modem 108 that uses one or more modem processors. The various functions related to the cell management component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the cell management component 40, including the cell search component 42, the decoder 44, and/or the identifier 46.

The cell management component 40, the cell search component 42, the decoder 44, and/or the identifier 46 may include hardware, firmware, and/or software code executable by a processor for performing V-cell ID signaling, usage, management and operations. For example, the hardware may include, for example, a hardware accelerator, or specialized processor.

Moreover, in an aspect, the UE 12 may include RF front end 104 and transceiver 106 for receiving and transmitting radio transmissions, for example, wireless communications 26. For example, transceiver 106 may transmit or receive one or more signals (e.g., PRACH). The transceiver 106 may measure a received pilot signal in order to determine signal quality and for providing feedback to the network entity 14 or 20. For example, transceiver 106 may communicate with modem 108 to transmit messages generated by cell management component 40 and to receive messages and forward them to cell management component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the cell management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 can communicate with, for example, network entity 14 or network entity 20. In an aspect, for example, modem 108 can configure transceiver 106 to operate at a specified frequency and power level based on the UE configuration of the UE 12 and communication protocol used by modem 108.

In an aspect, modem 108 may be a multiband-multimode modem, which may process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components of UE 12, or network entity 14 or 20 (e.g., RF front end 104, transceiver 106), to enable SFN-type transmission and/or reception of signals based on a specified modem configuration. In an aspect, the modem configuration may be based on the mode of the modem and the frequency band in use. In another aspect, the modem configuration may be based on UE configuration information associated with UE 12 as provided by the network during cell selection and/or cell reselection.

In some aspects, the UE 12 may further include memory 130, such as for storing data used herein and/or local versions of applications or the cell management component 40 and/or one or more subcomponents of the cell management component 40 being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining cell management component 40 and/or one or more of the subcomponents of the cell management component 40, and/or data associated therewith, when UE 12 and/or network entity 14 or 20 is operating processor 103 to execute the cell management component 40 and/or one or more subcomponents of the cell management component 40. In another aspect, for example, memory 130 may be a non-transitory computer-readable storage medium.

Figure 1B:
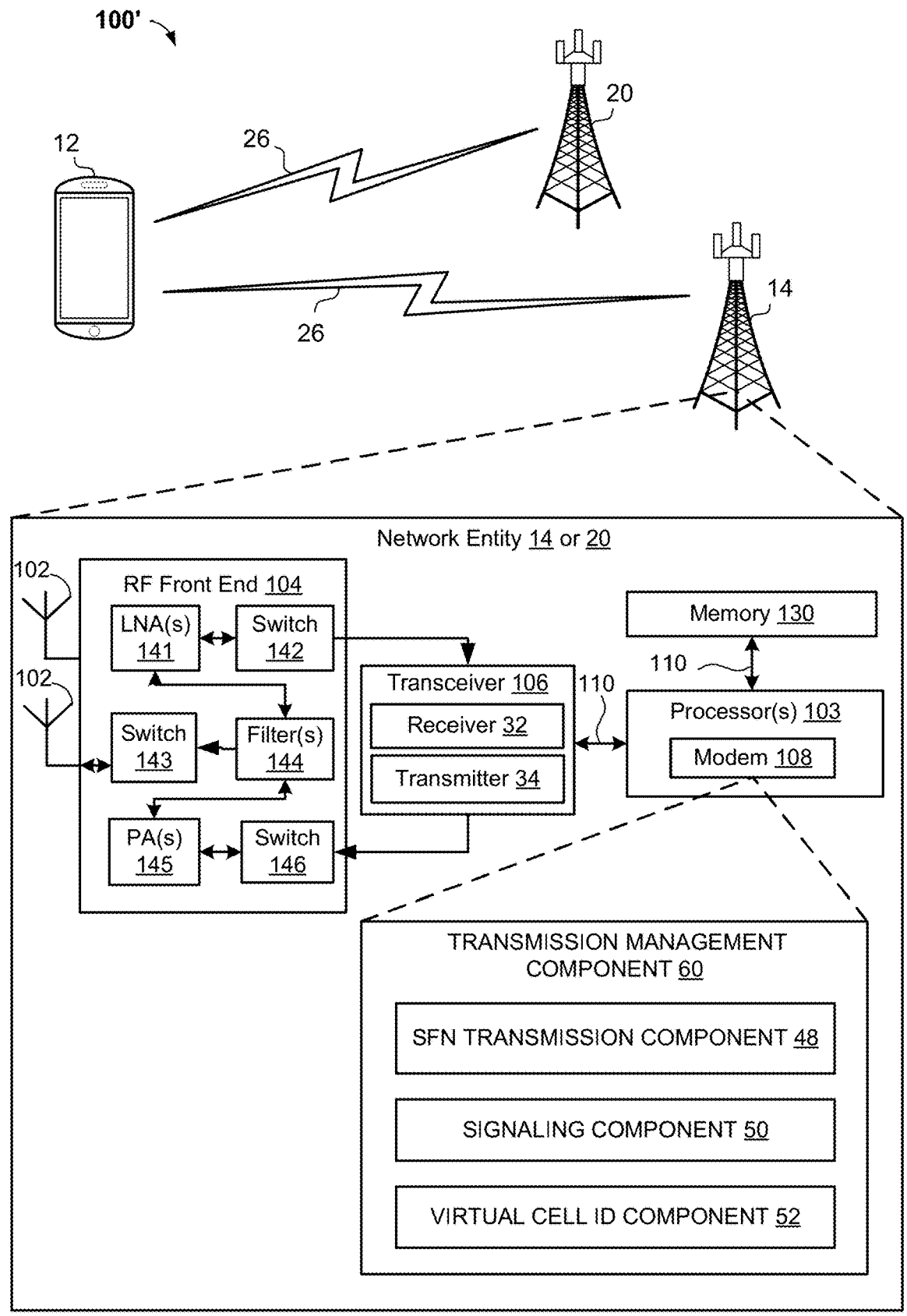
FIG. 1B is a block diagram illustrating a second example of a wireless communications system (e.g., a 5G NR system) including a user equipment (UE) and one or more base stations for signaling and use of V-cell ID for SFN-type transmissions, according to one or more of the presently described aspects.

Referring to FIG. 1B, in an aspect, similar to the wireless communication system 100 in FIG. 1A, a wireless communication system 100' (e.g., a 5G NR system) may include at least the UE 12 in communication coverage of at least the network entity 14 and/or 20 (e.g., a base station or a gNB, or a cell thereof, in a 5G NR network). The UE 12 may communicate with a network via the network entity 14 or 20.

According to the present aspects, the network entity 14 or 20 may include one or more processors 103 and a memory 130 that may operate in combination with a transmission management component 60, a SFN transmission component 48, a signaling component 50, and/or a virtual cell ID component 52. In some examples, the transmission management component 60 may be configured to prepare, signal and/or use a V-cell ID for SFN-type communications. In an aspect, the SFN transmission component 48 may be configured to determine or identify one or more SFN-type transmissions. In an aspect, the signaling component 50 may be configured to transmit or signal the V-cell ID in a pre-defined message or information block (e.g., MIB, MSIB or OSI). In another aspect, the virtual cell ID component 52 may be configured to determine a cell ID or a V-cell ID, and may generate a V-cell ID or truncate a cell ID, and/or related operations as described herein.

The transmission management component 60, the SFN transmission component 48, the signaling component 50, and/or the virtual cell ID component 52, may include hardware, firmware, and/or software code executable by a processor for performing configuring, transmitting, or signaling a V-cell ID. For example, the hardware may include, for example, a hardware accelerator, or specialized processor.

Moreover, in an aspect, the network entity 14 or 20 may include RF front end 104 and transceiver 106 for receiving and transmitting radio transmissions, for example, wireless communications 26 (e.g., beamforming or beams). For example, transceiver 106 may transmit or receive a signal or a message that includes a V-cell ID. In some examples, the transceiver 106 may measure a received signal in order to determine signal quality and for providing feedback. For example, transceiver 106 may communicate with modem 108 to transmit messages generated by the transmission management component 60 and to receive messages and forward them to the transmission management component 60.

The network entity 14 or 20 may further include memory 130, such as for storing data used herein and/or local versions of applications, or the transmission management component 60, and/or one or more subcomponents of the transmission management component 60 being executed by processor 103.

Figure 2:
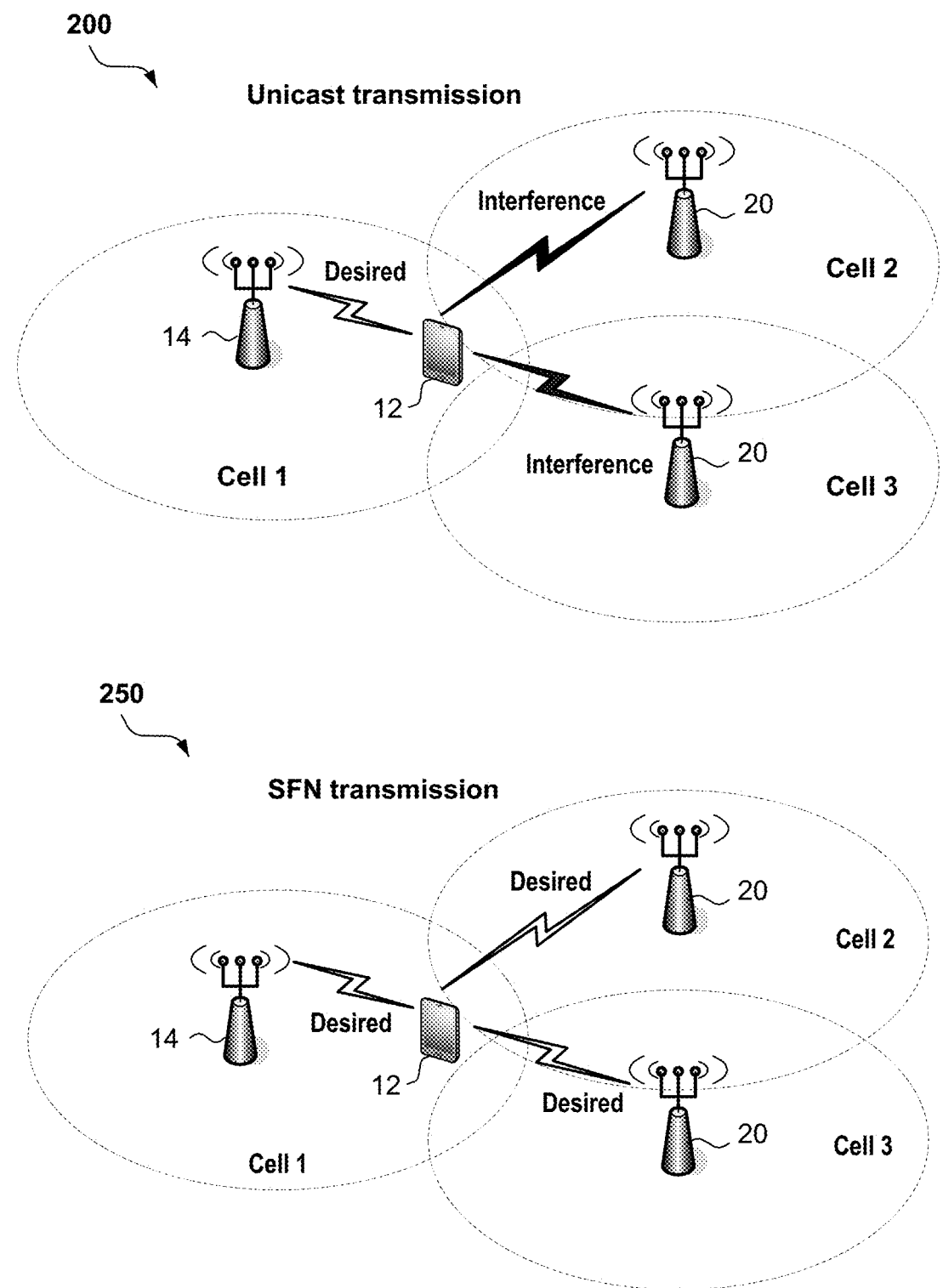
FIG. 2 are two examples illustrating two types of transmission, unicast transmission and SFN transmission, according to one or more of the presently described aspects.

Referring to FIG. 2, two types of transmission, unicast transmission and SFN transmission, are illustrated. In an aspect, a unicast transmission scheme 200 may be used in a wireless communications system (e.g., a 5G NR system). In some implementations of unicast transmission, signals are transmitted from a single source (e.g., a base station) to a specified destination (e.g., a target UE). In an example, the unicast transmission scheme 200 may be used or applied by the wireless communications system 100 or 100' (FIG. 1A or FIG. 1B), which may include the UE 12 in communication coverage of at least the network entity 14 and multiple network entities 20. In this example, multiple cells, network entities, base stations (e.g., gNBs) may transmit signals at the same time, and the UE 12 may receive both desired and interference signals. For example, the UE 12 may receive desired signals from the network entity 14 (or cell 1), and may also receive undesired or interference signals from one or more network entities 20 (or from cell 2 and/or cell 3).

Still referring FIG. 2, a SFN transmission scheme 250 may be used in a wireless communications system (e.g., a 5G NR system). In some aspects, multiple cells, TXPs, and/or base stations (e.g., gNBs) may transmit the same signals (e.g., same over-the-air waveforms) to one or more UEs. In an example, the SFN transmission scheme 250 may be used or applied by the wireless communications system 100 or 100' (FIG. 1A or FIG. 1B), which may include the UE 12 in communication coverage of at least the network entity 14 and multiple network entities 20. In some cases, multiple desired signals sent from multiple cells (e.g., cell 1, cell 2, and/or cell 3) or base stations (e.g., the network entity 14 and multiple network entities 20) are received at the receiver (e.g., the UE 12) as a combined signal (e.g., a non-coherently combined signal), which is more robust to channel conditions, and may cover wider area and/or longer distance than a unicast transmission (e.g., using the unicast transmission scheme 200).

Figure 3A:
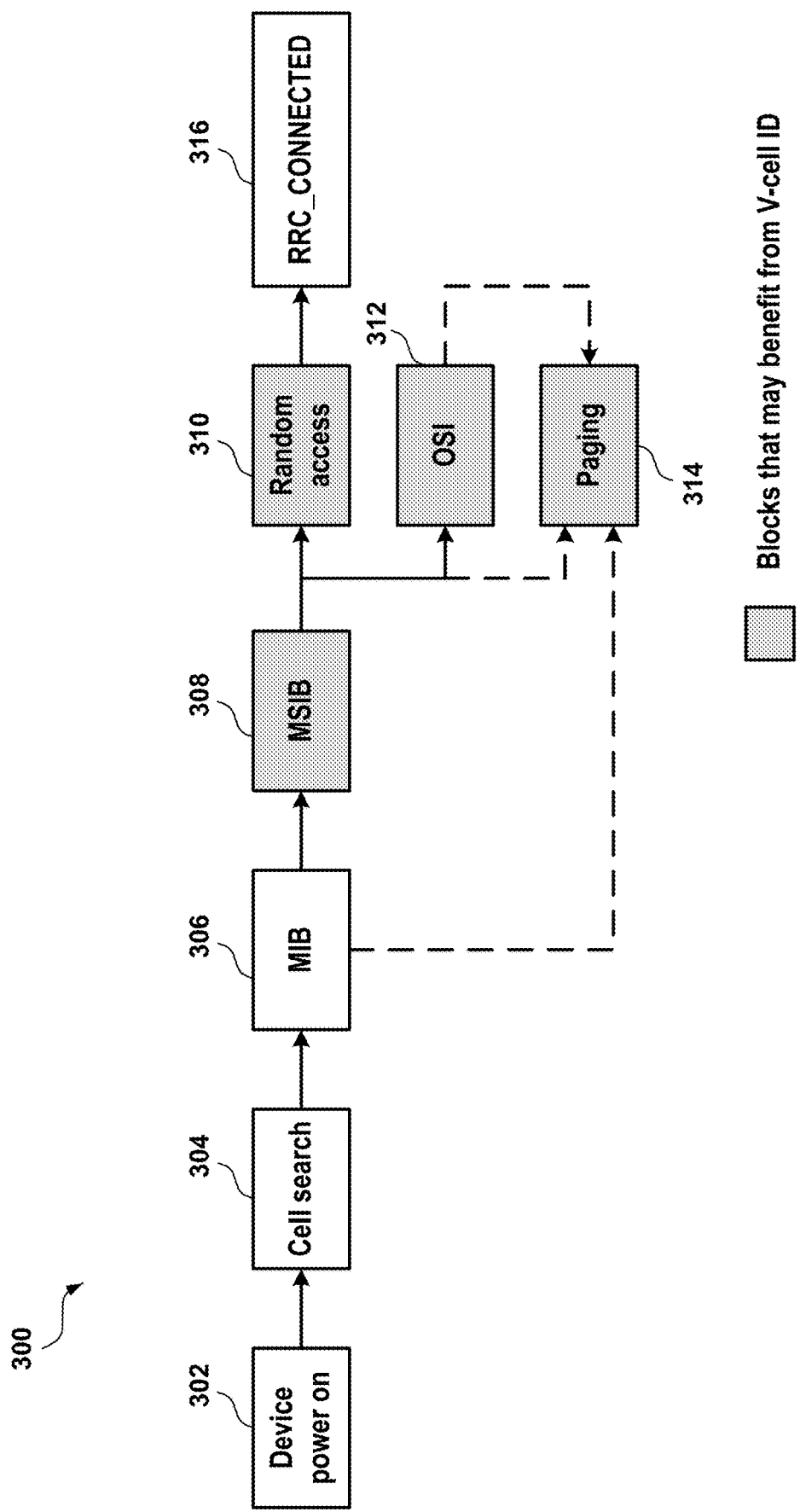
FIG. 3A is a first example of a block diagram of an access procedure related to signaling and reception of a V-cell ID, according to one or more of the presently described aspects.

Referring to FIG. 3A, in an aspect, an access procedure 300 provides examples related to signaling and receptions of V-cell ID(s). In an example, when a UE (e.g., a mobile device, or the UE 12 in FIG. 1A or FIG. 2) is powered on at block 302, the UE may perform a cell search at block 304 to obtain the cell ID of which the UE tries to access. In an aspect, with the obtained cell ID, the UE may demodulate or decode an MIB at block 306. In some examples, an MIB may contain or include some necessary system information, including information required to demodulate or decode an MSIB (block 308), and possibly information for paging (block 314). In an aspect, an MSIB may be demodulated or decoded subsequently at block 308. In some cases, an MSIB may contain system information for random access (block 310) and/or other system information (OSI) (block 312) acquisition, and possibly information for paging (block 314). In some examples, blocks 308, 310, 312, and/or 314 may benefit from using a V-cell ID (e.g., by reducing overall resource consumption and/or improved reliability). In some cases, after random access at block 310, the UE may stay or transition to RRC_CONNECTED mode or state at block 316.

In an aspect of signaling of a V-cell ID, a base station (e.g., e.g., the network entity 14 or the network entity 20 in FIG. 1B or FIG. 2) may use an MIB to signal the V-cell ID for one or more MSIBs. In some implementations, one or more SFN-type transmissions of the one or more MSIBs may include the one or more SFN-type transmissions of corresponding control channels and/or reference signals. For example, after acquiring a cell ID (e.g., during the cell search at block 304), a UE (e.g., the UE 12 in FIG. 1A or FIG. 2) may decode the MIB received in a NR-physical broadcast channel (PBCH), which may indicate resources for transmitting MSIB. In some cases, to enable one or more SFN-type transmissions of MSIB (possibly including corresponding control channel and/or RS) from multiple cells, TXPs, or gNBs, the V-cell ID may be signaled or transmitted as a part of the MIB (e.g., at block 306).

In another aspect of signaling of a V-cell ID, a base station (e.g., e.g., the network entity 14 or 20) may use an MSIB to signal the V-cell ID to be used for transmitting the other information of a SIB (e.g., the information not included in the MSIB but in the SIB). In an example, other system information (OSI) that is not included in the MSIB may be subsequently broadcasted by the base station. In some cases, to enable one or more SFN-type transmissions of OSI (possibly including corresponding control channel and/or RS) from multiple cells, TXPs, or gNBs, the V-cell ID may be signaled or transmitted as a part of the MSIB (e.g., at block 308).

In yet another aspect of signaling of a V-cell ID, a base station (e.g., e.g., the network entity 14 or 20) may use an MSIB to signal the V-cell ID for Message 2 (Msg2) and/or Message 3 (Msg3). In an example, an MSIB may indicate the resources for a physical random access channel (PRACH), and a UE (e.g., the UE 12) may perform random access (e.g., at block 310) on the PRACH. In some cases, to enable one or more SFN-type transmissions of Msg2 and/or Msg3 (possibly including corresponding control channel and/or RS) from multiple cells, TXPs, or gNBs, the V-cell ID may be signaled or transmitted as a part of MSIB (e.g., at block 308).

In an aspect of signaling of a V-cell ID, a base station (e.g., e.g., the network entity 14 or 20) may use an MIB, an MSIB, or OSI to signal, transmit, or deliver the V-cell ID for paging (e.g., at block 314). In some examples, OSI may carry relatively less-important and/or less-urgent system information (e.g., common or control information). In some cases, to enable one or more SFN-type transmissions of paging message(s) from multiple cells, TXPs, or gNBs for UEs (e.g., the UE 12) in idle mode (possibly including corresponding control channel and/or RS), the V-cell ID may be signaled or transmitted as a part of MIB (e.g., at block 306), MSIB (e.g., at block 308), or OSI (e.g., at block 312).

Figure 3B:
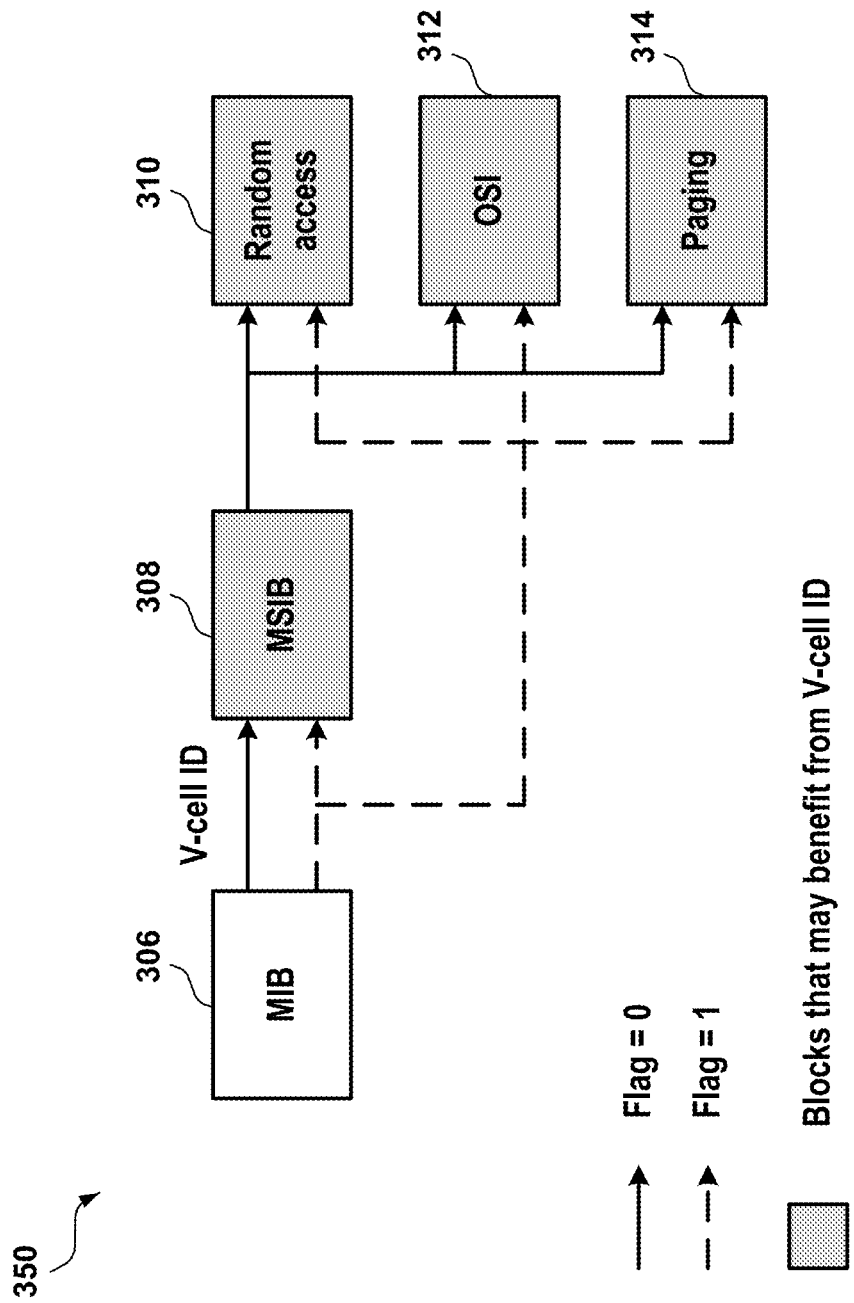
FIG. 3B is a second example of a block diagram of an access procedure related to signaling and reception of a V-cell ID used for one or more processes, according to one or more of the presently described aspects.

Referring to FIG. 3B, in an aspect, similar to the access procedure 300, an access procedure 350 provides examples related to signaling and reception of V-cell ID(s). In some cases, to reduce signal overhead, a same V-cell ID may be used for both random access at block 310 (e.g., Msg2 and/or Msg3) and paging at block 314. In particular, for example, a one-bit flag in MIB (block 306) may be used to indicate whether the V-cell ID in MIB (block 306) for MSIB transmissions (block 308) may also be used for other processes as shown in FIG. 3B (e.g., random access at block 310, OSI at block 312, and/or paging at block 314). In some implementations, the one-bit flag may be set or configured as "0" or "1". For example, when the one-bit flag in MIB (block 306) is set or configured to "0", the flow in solid lines may be used as shown in FIG. 3B. In this example, the V-cell ID in MIB for MSIB transmissions may not be used for other processes. In another example, when the one-bit flag in MIB (block 306) is set or configured to "1", the flow in dash lines may be used as shown in FIG. 3B. In this case, the V-cell ID in MIB for MSIB (block 308) may also be used for other processes, e.g., random access at block 310, OSI at block 312, and/or paging at block 314. In some examples, only if the flag is inactive, the full V-cell ID for other processes may be included in MSIB (block 308) or OSI (block 312).

Figure 4:
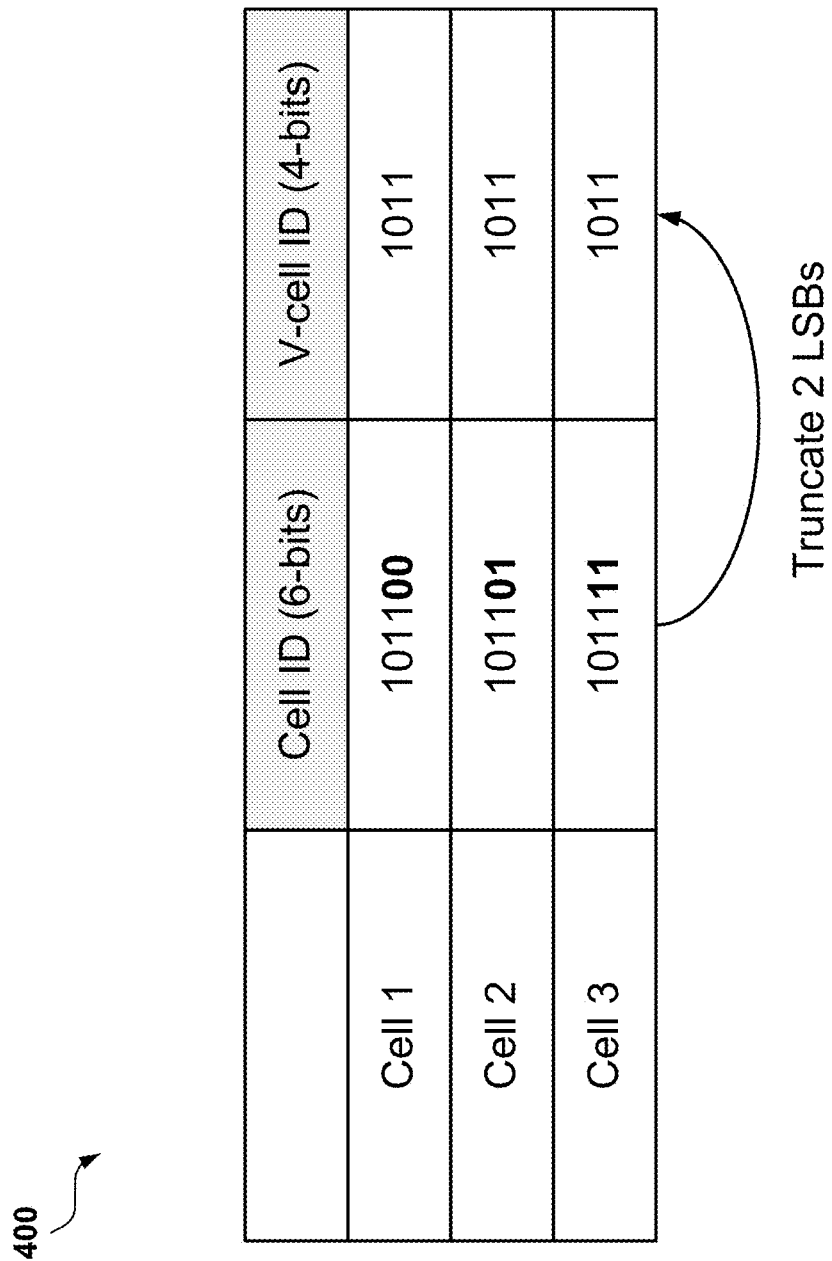
FIG. 4 is an example of a table with cell IDs and V-cell IDs used for SFN-type transmissions, according to one or more of the presently described aspects.

Referring to FIG. 4, in an aspect, a table 400 maybe used by the SFN-type transmission scheme 250 in FIG. 2 to signal the V-cell ID. As shown in the table 400, fewer bits may be used by a V-cell ID than the bits used by a cell ID. In some cases, a V-cell ID may be a truncated version of a normal cell ID. In an example, instead of delivering a full V-cell ID, the number of truncated bits may be specified for a truncated version of the V-cell ID. In some cases, the number and/or location of truncated bits may be pre-determined, or signaled as a part of an MIB. In this case, some cell ID planning may be needed so that the cells intended to have the same V-cell ID may be given cell IDs that differ only in the truncated portion. For example, a SFN (e.g., the SFN-type transmission scheme 250) may include three cells (cells 1, 2, and 3), and each cell may have a 6-bit cell ID and a 4-bit V-cell ID. In this example, each V-cell ID is obtained by truncating 2 least significant bits (LSBs) of the corresponding cell ID.

Figure 5:
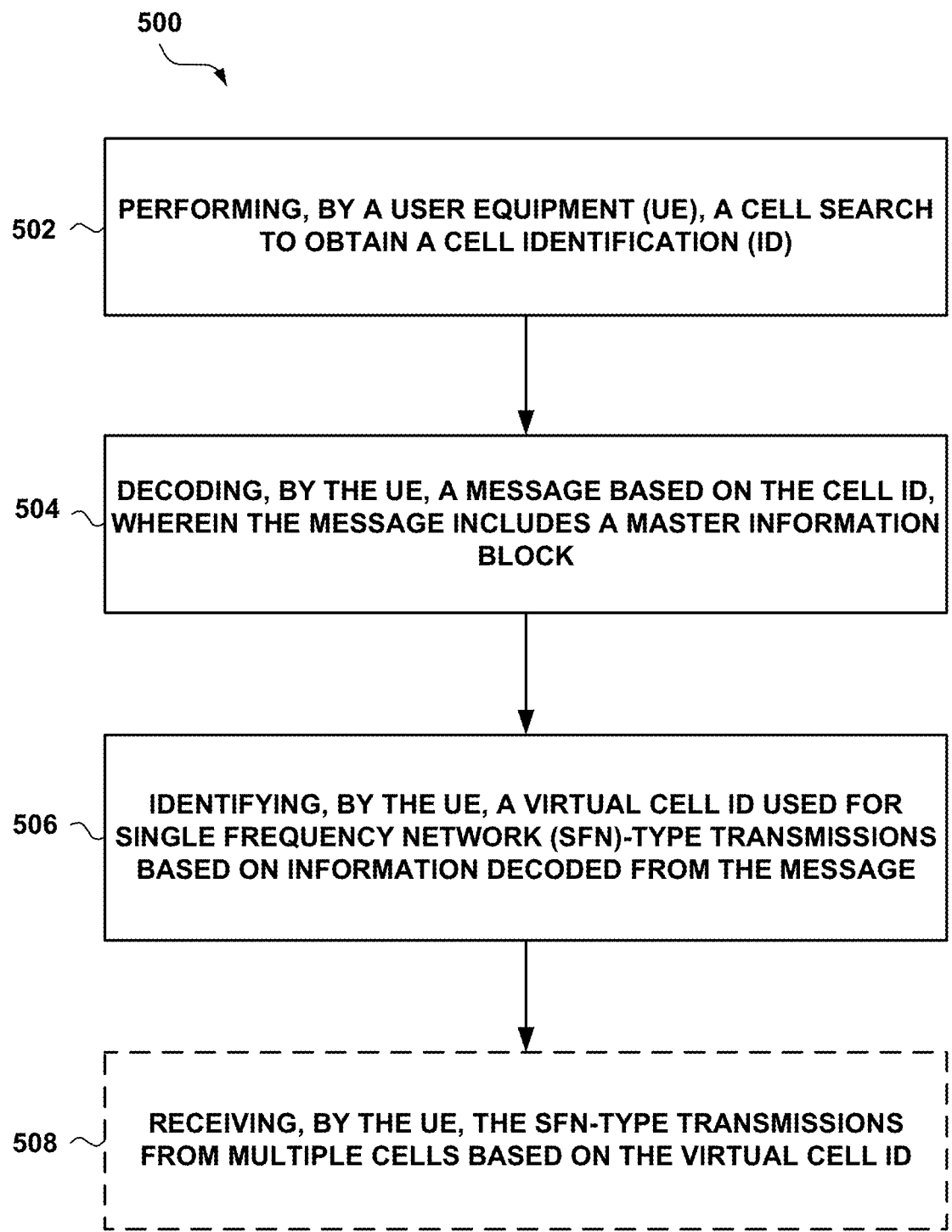
FIG. 5 is a flow chart of a first example method of signaling and using V-cell ID for SFN-type transmissions, according to one or more of the presently described aspects.

Referring to FIG. 5, in an operational aspect, a UE, such as UE 12 (FIGS. 1A and 2), may perform one or more aspects of a method 500 for signaling and reception of V-cell ID in a wireless communications system (e.g., a 5G NR system). For example, one or more of the processors 103, the memory 130, the modem 108, the transceiver 106, the cell management component 40, the cell search component 42, the decoder 44, and/or the identifier 46 may be configured to perform aspects of the method 500.

In an aspect, at block 502, the method 500 may include performing, by a UE, a cell search to obtain a cell ID. In an aspect, for example, the cell management component 40 and/or the cell search component 42 (FIG. 1A), e.g., in conjunction with one or more of the processors 103, the memory 130, the modem 108, and/or the transceiver 106, may be configured to perform a cell search to obtain the cell ID.

In another aspect, at block 504, the method 500 may include decoding, by the UE, a message based on the cell ID, wherein the message includes a master information block. In an aspect, for example, the cell management component 40 and/or the decoder 44 (FIG. 1A), e.g., in conjunction with one or more of the processors 103, the memory 130, the modem 108, and/or the transceiver 106, may be configured to decode a message based on the cell ID. In some examples, the message may include an MIB. In other examples, the message may include an MSIB or OSI.

In an aspect, at block 506, the method 500 may include identifying, by the UE, a virtual cell ID used for SFN-type transmissions based on information decoded from the message. In an aspect, for example, the cell management component 40, and/or the identifier 46, e.g., in conjunction with one or more of the processors 103, the memory 130, the modem 108, and/or the transceiver 106, may be configured to identify the virtual cell ID used for SFN-type transmissions based on information decoded from the message at block 504.

In an aspect, at block 508, the method 500 may optionally include receiving, by the UE, the SFN-type transmissions from multiple cells based on the virtual cell ID. In an aspect, for example, the cell management component 40, e.g., in conjunction with one or more of the processors 103, the memory 130, the modem 108, and/or the transceiver 106, may be configured to receive SFN-type transmissions from multiple cells based on the virtual cell ID.

Figure 6:
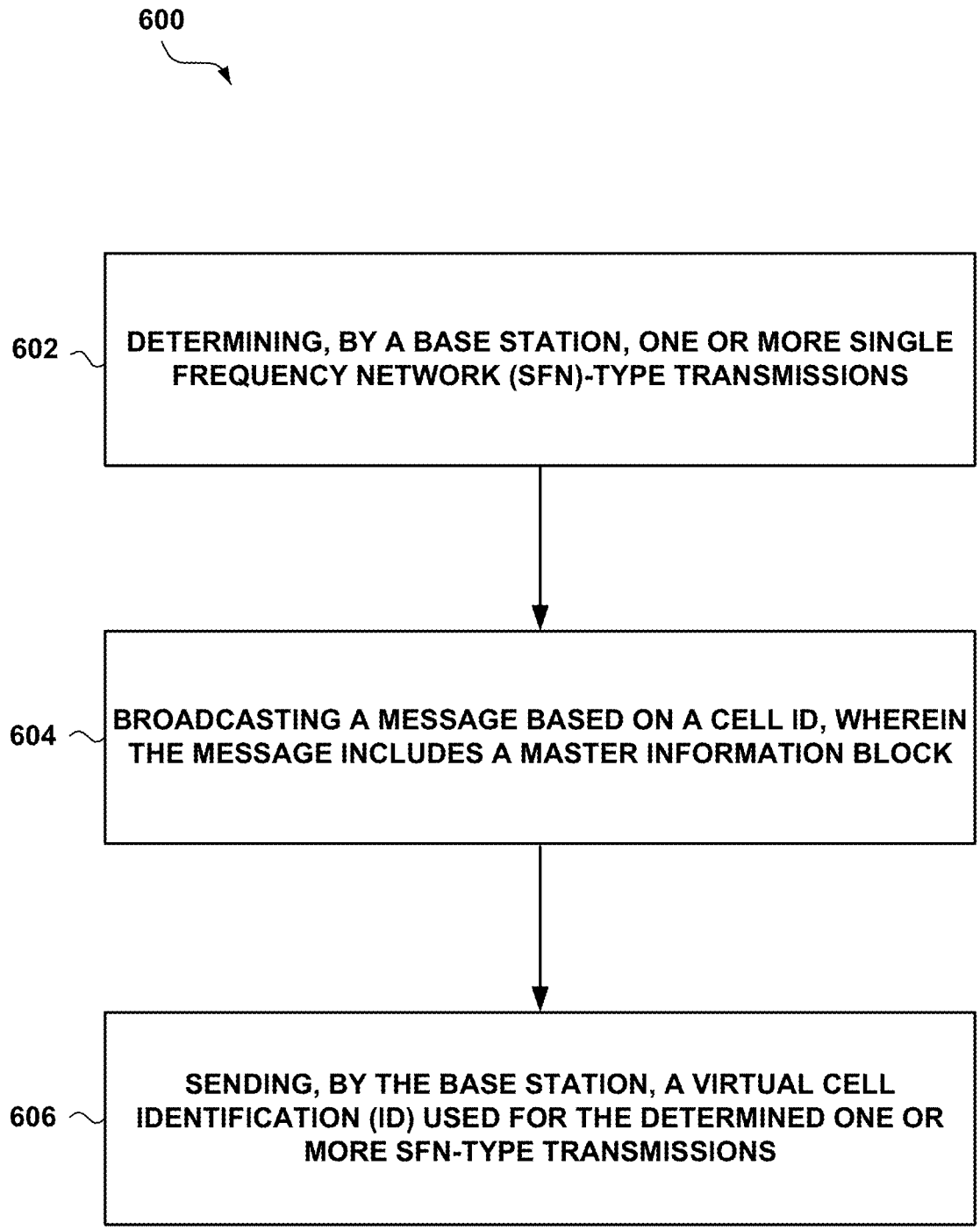
FIG. 6 is a flow chart of a second example method of signaling and using V-cell ID for SFN-type transmissions, according to one or more of the presently described aspects.

Referring to FIG. 6, in an operational aspect, a network entity such as the network entity 14 or the network entity 20 (FIG. 1B) may perform one or more aspects of a method 600 for signaling of V-cell ID to a UE (e.g., UE 12) in a wireless communications system (e.g., a 5G NR system). For example, one or more of the processors 103, the memory 130, the modem 108, the transceiver 106, the transmission management component 60, the SFN transmission component 48, the signaling component 50, and/or the virtual cell ID component 52, may be configured to perform aspects of the method 600.

In an aspect, at block 602, the method 600 may include determining, by a base station, one or more SFN-type transmissions. In an aspect, for example, the transmission management component 60, and/or the SFN transmission component 48, e.g., in conjunction with one or more of the processors 103, the memory 130, the modem 108, and/or the transceiver 106, may be configured to determine one or more SFN-type transmissions. In some examples, the one or more SFN-type transmissions may be broadcast messages or paging messages, and/or transmissions of MIB, MSIB, or OSI.

In some aspects, at block 604, the method 600 may include broadcasting a message based on a cell ID, wherein the message includes a master information block. In some aspects, the transmission management component 60, and/or signaling component 50, e.g., in conjunction with one or more of the processors 103, the memory 130, the modem 108, and/or the transceiver 106, may be configured to broadcast a message based on a cell ID. In certain examples, the message may include an MIB. In other examples, the message may include an MSIB or OSI.

In an aspect, at block 606, the method 600 may include sending, by the base station, a virtual cell ID used for the determined one or more SFN-type transmissions. In an aspect, for example, the transmission management component 60, the SFN transmission component 48, the signaling component 50, and/or the virtual cell ID component 52, e.g., in conjunction with one or more of the processors 103, the memory 130, the modem 108, and/or the transceiver 106, may be configured to send or signal the virtual cell ID used for the one or more SFN-type transmissions determined at block 602. In some examples, the virtual cell ID may be included in an MIB, an MSIB, or OSI.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G NR system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communications, comprising:
    performing, by a user equipment (UE), a cell search to obtain a cell identification (ID);
    decoding, by the UE, a message based on the cell ID, wherein the message includes a master information block (MIB) and a minimum system information block (MSIB); and
    identifying, by the UE, a virtual cell ID used for single frequency network (SFN)-type transmissions based on information decoded from the message comprising the MSIB for the SFN-type transmissions of at least one of OSI, a Message 2 (Msg2), or a Message 3 (Msg3).

2. The method of claim 1, further comprising:
    receiving, by the UE, the SFN-type transmissions from multiple cells based on the virtual cell ID.

3. The method of claim 1, wherein the message further includes information for paging.

4. The method of claim 1, wherein the MSIB includes information for random access, other system information (OSI) acquisition, or information for paging.

5. The method of claim 1, wherein the virtual cell ID is identified based on the information decoded from the MIB for SFN-type transmissions of one or more MSIBs.

6. The method of claim 1, wherein the message further includes OSI, and wherein the virtual cell ID is identified based on the information decoded from the message for SFN-type transmissions of at least a paging message for one or more UEs in idle mode.

7. The method of claim 1, wherein the virtual cell ID is used for random access and paging.

8. The method of claim 1, wherein the virtual cell ID is a truncated version of the cell ID.

9. An apparatus for wireless communications, comprising:
   a memory configured to store instructions;
   a transceiver; and
   at least one processor communicatively coupled with the memory and the transceiver, wherein the at least one processor is configured to execute the instructions to:
   perform a cell search to obtain a cell identification (ID);
   decode a message based on the cell ID, wherein the message includes a master information block (MIB) and a minimum system information block (MSIB); and
   identify a virtual cell ID used for single frequency network (SFN)-type transmissions based on information decoded from the message comprising the MSIB for SFN-type transmissions of at least one of OSI, a Message 2 (Msg2), or a Message 3 (Msg3).

10. The apparatus of claim 9, wherein the at least one processor is further configured to execute the instructions to receive, via the transceiver, the SFN-type transmissions from multiple cells based on the virtual cell ID.

11. The apparatus of claim 9, wherein the message further includes information for paging.

12. The apparatus of claim 9, wherein the MSIB includes information for random access, other system information (OSI) acquisition, or information for paging.

13. The apparatus of claim 9, wherein the virtual cell ID is identified based on the information decoded from the MIB for SFN-type transmissions of one or more MSIBs.

14. The apparatus of claim 9, wherein the message further includes OSI, and wherein the virtual cell ID is identified based on the information decoded from the message for SFN-type transmissions of at least a paging message for one or more UEs in idle mode.

15. The apparatus of claim 9, wherein the virtual cell ID is used for random access and paging.

16. The apparatus of claim 9, wherein the virtual cell ID is a truncated version of the cell ID.

17. A computer-readable medium having instructions stored therein that, when executed by at least one processor, cause the at least one processor to:
   perform a cell search to obtain a cell identification (ID);
   decode a message based on the cell ID, wherein the message includes a master information block (MIB) and a minimum system information block (MSIB); and
   identify a virtual cell ID used for single frequency network (SFN)-type transmissions based on information decoded from the message comprising the MSIB for the SFN-type transmissions of at least one of OSI, a Message 2 (Msg2), or a Message 3 (Msg3).

18. An apparatus for wireless communications, comprising:
   means for performing a cell search to obtain a cell identification (ID);
   means for decoding a message based on the cell ID, wherein the message includes a master information block (MIB) and a minimum system information block (MSIB); and
   means for identifying a virtual cell ID used for single frequency network (SFN)-type transmissions based on information decoded from the message comprising the MSIB for the SFN-type transmissions of at least one of OSI, a Message 2 (Msg2), or a Message 3 (Msg3).

19. A method of wireless communications, comprising:
   determining, by a base station, one or more single frequency network (SFN)-type transmissions;
   broadcasting a message based on a cell ID, wherein the message includes a master information block (MIB); and
   sending, by the base station, a virtual cell identification (ID) used for the determined one or more SFN-type transmissions in a minimum system information block (MSIB) for the one or more SFN-type transmissions of at least one of OSI, an Msg2, or an Msg3.

20. The method of claim 19, wherein the one or more SFN-type transmissions include multiple SFN-type transmissions from multiple cells with the same virtual cell ID.

21. The method of claim 19, wherein sending the virtual cell ID comprises sending the virtual cell ID in the MIB or via OSI.

22. The method of claim 19, wherein sending the virtual cell ID comprises sending the virtual cell ID in the MIB for the one or more SFN-type transmissions of one or more MSIBs.

23. The method of claim 22, wherein the one or more SFN-type transmissions of one or more MSIBs includes the one or more SFN-type transmissions of corresponding control channels and reference signals.

24. The method of claim 19, wherein the one or more SFN-type transmissions of at least one of OSI, an Msg2, or an Msg3 includes the one or more SFN-type transmission of corresponding control channels and reference signals.

25. The method of claim 19, wherein sending the virtual cell ID comprises sending the virtual cell ID in the MIB or OSI for the one or more SFN-type transmissions of at least a paging message for one or more UEs in idle mode.

26. The method of claim 19, wherein the virtual cell ID is used for random access and paging.

27. The method of claim 19, wherein the virtual cell ID is a truncated version of the cell ID.

28. An apparatus for wireless communications, comprising:
   a memory configured to store instructions;
   a transceiver; and
   at least one processor communicatively coupled with the memory and the transceiver, wherein the at least one processor is configured to execute the instructions to:
   determine one or more single frequency network (SFN)-type transmissions;
   broadcast, via the transceiver, a message based on a cell ID, wherein the message includes a master information block (MIB); and
   send, via the transceiver, a virtual cell identification (ID) used for the determined one or more SFN-type transmissions in a minimum system information block (MSIB) for the one or more SFN-type transmissions of at least one of OSI, an Msg2, or an Msg3.

29. The apparatus of claim 28, wherein the one or more SFN-type transmissions include multiple SFN-type transmissions from multiple cells with the same virtual cell ID.

30. The apparatus of claim 28, wherein sending the virtual cell ID comprises sending, via the transceiver, the virtual cell ID in the MIB or via OSI.

31. The apparatus of claim 28, wherein sending the virtual cell ID comprises sending, via the transceiver, the virtual cell ID in the MIB for the one or more SFN-type transmissions of one or more MSIBs.

32. The apparatus of claim 31, wherein the one or more SFN-type transmissions of one or more MSIBs includes the one or more SFN-type transmissions of corresponding control channels and reference signals.

33. The apparatus of claim 28, wherein the one or more SFN-type transmissions of at least one of OSI, an Msg2, or an Msg3 includes the one or more SFN-type transmissions of corresponding control channels and reference signals.

34. The apparatus of claim 28, wherein sending the virtual cell ID comprises sending, via the transceiver, the virtual cell ID in the MIB or OSI for the one or more SFN-type transmissions of at least a paging message for one or more UEs in idle mode.

35. The apparatus of claim 28, wherein the virtual cell ID is used for random access and paging.

36. The apparatus of claim 28, wherein the virtual cell ID is a truncated version of the cell ID.

37. A computer-readable medium having instructions stored therein that, when executed by at least one processor, cause the at least one processor to:

determine one or more single frequency network (SFN)-type transmissions;

broadcast a message based on a cell ID, wherein the message includes a master information block (MIB); and send a virtual cell identification (ID) used for the determined one or more SFN-type transmissions in a minimum system information block (MSIB) for the one or more SFN-type transmissions of at least one of OSI, an Msg2, or an Msg3.

38. An apparatus for wireless communications, comprising:

means for determining one or more single frequency network (SFN)-type transmissions;

means for broadcasting a message based on a cell ID, wherein the message includes a master information block (MIB); and means for sending a virtual cell identification (ID) used for the determined one or more SFN-type transmissions in a minimum system information block (MSIB) for the one or more SFN-type transmissions of at least one of OSI, an Msg2, or an Msg3.

* * * * *